United States Patent
Guo et al.

(10) Patent No.: US 12,026,966 B2
(45) Date of Patent: Jul. 2, 2024

(54) METHOD FOR RECOGNIZING DIALOGUE INTENTION, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Hongjie Guo, Beijing (CN); Hongyang Zhang, Beijing (CN); Zhenyu Jiao, Beijing (CN); Shuqi Sun, Beijing (CN); Yue Chang, Beijing (CN); Tingting Li, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 369 days.

(21) Appl. No.: 17/476,177

(22) Filed: Sep. 15, 2021

(65) Prior Publication Data
US 2022/0044081 A1    Feb. 10, 2022

(30) Foreign Application Priority Data
Dec. 9, 2020   (CN) .......................... 202011449389.X

(51) Int. Cl.
*G10L 15/18*   (2013.01)
*G06F 18/22*   (2023.01)
(Continued)

(52) U.S. Cl.
CPC ............ *G06V 30/274* (2022.01); *G06F 18/22* (2023.01); *G06F 40/284* (2020.01);
(Continued)

(58) Field of Classification Search
CPC .................................................. G10L 15/1822
See application file for complete search history.

(56) References Cited

U.S. PATENT DOCUMENTS

| | | | |
|---|---|---|---|
| 2010/0174539 A1* | 7/2010 | Nandhimandalam | ....................... G10L 19/038 704/E19.001 |
| 2020/0035228 A1* | 1/2020 | Seo | ......... G06F 40/295 |
| 2020/0097563 A1 | 3/2020 | Alexander | |

FOREIGN PATENT DOCUMENTS

| | | | |
|---|---|---|---|
| CN | 111178537 A | 5/2020 | |
| CN | 111767737 A | 10/2020 | |

(Continued)

OTHER PUBLICATIONS

Japanese Office Action issued in corresponding application No. 2021-145446, issued Nov. 29, 2022.
(Continued)

*Primary Examiner* — Feng-Tzer Tzeng
(74) *Attorney, Agent, or Firm* — Maschoff Brennan

(57) ABSTRACT

A method for recognizing a dialogue intention, an electronic device and a storage medium are provided. The solution includes: obtaining a sample sentence with an intention category to be predicted and a plurality of supporting sentences each labeled with an intention category; and inputting the sample sentence and the plurality of supporting sentences into a trained intention recognition model, in which the trained intention recognition model is configured to generate a sample sentence vector corresponding to the sample sentence and category vectors corresponding to the plurality of supporting sentences based on the sample sentence and the plurality of supporting sentences, calculate matching degrees between the sample sentence vector and the category vectors, and obtain a predicted intention category of the sample sentence based on the matching degrees.

18 Claims, 11 Drawing Sheets

(51) Int. Cl.
*G06F 40/284* (2020.01)
*G06F 40/295* (2020.01)
*G06F 40/30* (2020.01)
*G06V 30/262* (2022.01)

(52) U.S. Cl.
CPC ............ *G06F 40/295* (2020.01); *G06F 40/30* (2020.01); *G10L 15/1822* (2013.01)

(56) References Cited

FOREIGN PATENT DOCUMENTS

| | | | |
|---|---|---|---|
| CN | 111860580 A | | 10/2020 |
| CN | 107562816 B | * | 2/2021 |
| CN | 112528657 A | * | 3/2021 |
| JP | 2018528458 A | | 9/2018 |
| JP | 2019204268 A | | 11/2019 |
| JP | 2020521210 A | | 7/2020 |
| JP | 2020123331 A | | 8/2020 |
| JP | 2020187282 A | | 11/2020 |
| WO | 2019/205318 A1 | | 10/2019 |

OTHER PUBLICATIONS

CN Office Action dated Dec. 26, 2023 as received in Application No. 202011449389.X.

\* cited by examiner

METHOD FOR RECOGNIZING DIALOGUE INTENTION, ELECTRONIC DEVICE AND STORAGE MEDIUM

CROSS-REFERENCE TO RELATED APPLICATIONS

This application claims the benefit of priority to Chinese Application No. 202011449389.X, filed on Dec. 9, 2020, the contents of which are incorporated herein by reference in their entirety.

TECHNICAL FIELD

Embodiments of the present disclosure generally relate to a field of data processing technology, and more specifically to a field of machine learning technology such as artificial intelligence and deep learning.

BACKGROUND

In recent years, with the rise of technologies in a field of dialogue, recognition of a dialogue intention has gradually become one of the important research directions. In a recognition process of a dialogue intention, labeled data is usually used as a basis of the recognition of a dialogue intention.

SUMMARY

A method for recognizing a dialogue intention, an electronic device and a storage medium are provided in the present disclosure.

According to a first aspect, there is provided a method for recognizing a dialogue intention, including: obtaining a sample sentence with an intention category to be predicted and a plurality of supporting sentences each labeled with an intention category; and inputting the sample sentence and the plurality of supporting sentences into a trained intention recognition model, in which the trained intention recognition model is configured to generate a sample sentence vector corresponding to the sample sentence and category vectors corresponding to the plurality of supporting sentences based on the sample sentence and the plurality of supporting sentences, calculate matching degrees between the sample sentence vector and the category vectors, and obtain a predicted intention category of the sample sentence based on the matching degrees.

According to a second aspect, there is provided an electronic device, including: at least one processor; and a memory communicatively coupled to the at least one processor. The memory is configured to store instructions executable by the at least one processor. When the instructions are executed by the at least one processor, the at least one professor is configured to execute the method for recognizing a dialogue intention in the first aspect of the present disclosure.

According to a third aspect, there is provided a non-transitory computer-readable storage medium having computer instructions stored thereon. The computer instructions are configured to cause a computer to execute the method for recognizing a dialogue intention in the first aspect of the present disclosure.

It is to be understood that the content in this part is not intended to identify key or important features of the embodiments of the present disclosure, and does not limit the scope of the present disclosure. Other features of the present disclosure will be easily understood through the following specification.

BRIEF DESCRIPTION OF THE DRAWINGS

The drawings are used to better understand the solution, and are not restrictive of the disclosure, as claimed.

DETAILED DESCRIPTION

The following describes exemplary embodiments of the present disclosure with reference to the attached drawings, which include various details of the embodiments of the present disclosure to facilitate understanding, and they should be considered as merely exemplary. Therefore, those skilled in the art should realize that various changes and modifications can be made to the embodiments described herein without departing from the scope and spirit of the present disclosure. Similarly, for clarity and conciseness, descriptions of well-known functions and structures are omitted in the following description.

The following is a brief description of the technical fields that the solution of the present disclosure involved:

AI (Artificial Intelligence) is a discipline that studies computers to simulate certain human thinking processes and intelligent behaviors (such as learning, reasoning, thinking, planning, and the like), relating to both hardware-level technologies and software-level technologies. Artificial intelligence hardware technologies generally include computer vision technology, speech recognition technology, natural language processing technology and machine learning/deep learning, big data processing technology, and knowledge graph technology and other aspects.

DL (Deep learning) is to learn an inherent law and presentation level of sample data, and the information obtained during this learning process is of great help to interpretation of data such as text, images, and sounds. Its ultimate goal is to enable machines to have analytical and learning abilities like human, and to recognize data such as texts, images, and sounds. DL is a complex machine learning algorithm that has achieved far more effects in speech and image recognition than previous related arts.

ML (Machine Learning) is a multidisciplinary inter-discipline involving probability theory, statistics, approximation theory, convex analysis, algorithm complexity theory, and the like, which specializes in how computers simulate or realize learning behaviors of human in order to obtain new knowledge or skills, reorganize existing knowledge structures to continuously improve computers' performance. It is the core of AI, and is the fundamental way to make computers intelligent.

As for an existing method for recognizing a dialogue intention in the related art, especially in a cold-start stage of a real dialogue scene, due to the extremely small scale of labeled data, it is bound to cause overfitting phenomena which leads to extremely low accuracy of a recognition result of the dialogue intention. Therefore, how to improve the accuracy of the recognition result of the dialogue intention has become one of the important research directions.

The following attached drawings illustrate a method and an apparatus for recognizing a dialogue intention, an electronic device and a storage medium in the embodiments of the present disclosure.

Figure 1:
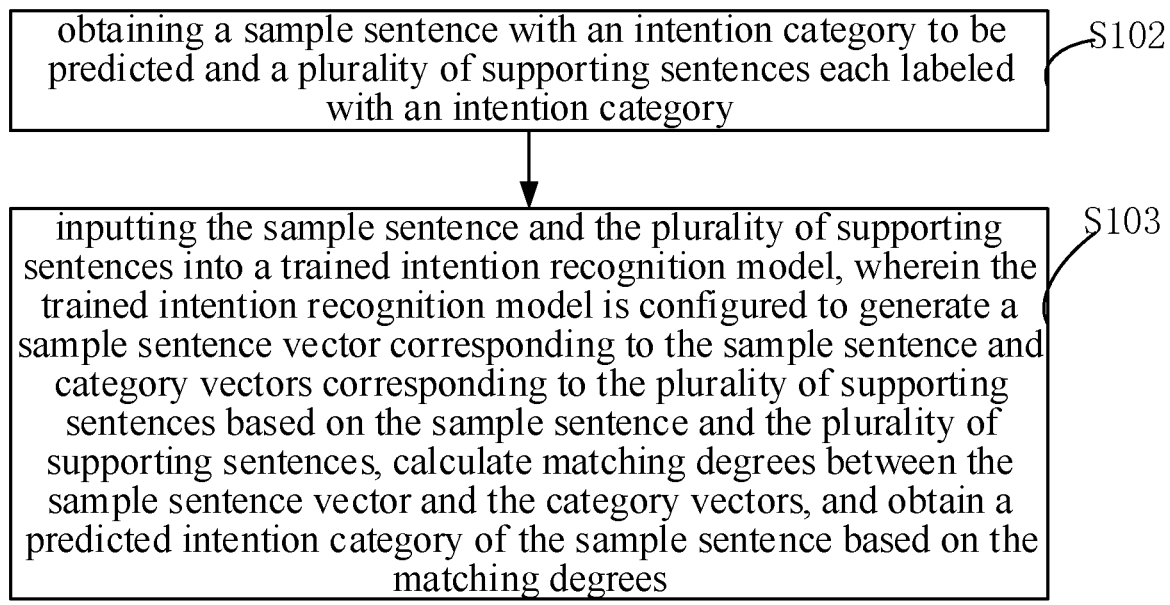
FIG. 1 is a flow chart illustrating a method for recognizing a dialogue intention according to a first embodiment of the present disclosure.

FIG. 1 is a flow chart illustrating a method for recognizing a dialogue intention according to a first embodiment of the present disclosure. It should be noted that an execution subject of the method for recognizing a dialogue intention in the embodiments of the present disclosure may be an apparatus for recognizing a dialogue intention, and the apparatus may specifically be implemented as a hardware device, or a software in a hardware device, in which the hardware device can be a terminal device, a server, and the like. As illustrated in FIG. 1, the method for recognizing a dialogue intention provided by the embodiment includes the following blocks.

In S101, a sample sentence with an intention category to be predicted and a plurality of supporting sentences each labeled with an intention category are obtained.

In the embodiments of the present disclosure, recognition of a dialogue intention can be realized through a process of determining whether the sample sentence with the intention category to be predicted belongs to an existing dialogue intention. That is, the recognition of a dialogue intention can be realized through the process of determining whether the sample sentence with the intention category to be predicted belongs to the plurality of supporting sentences each labeled with an intention category.

The sample sentence with the intention category to be predicted may be any input sentence that is not labeled with an intention category.

Figure 2:
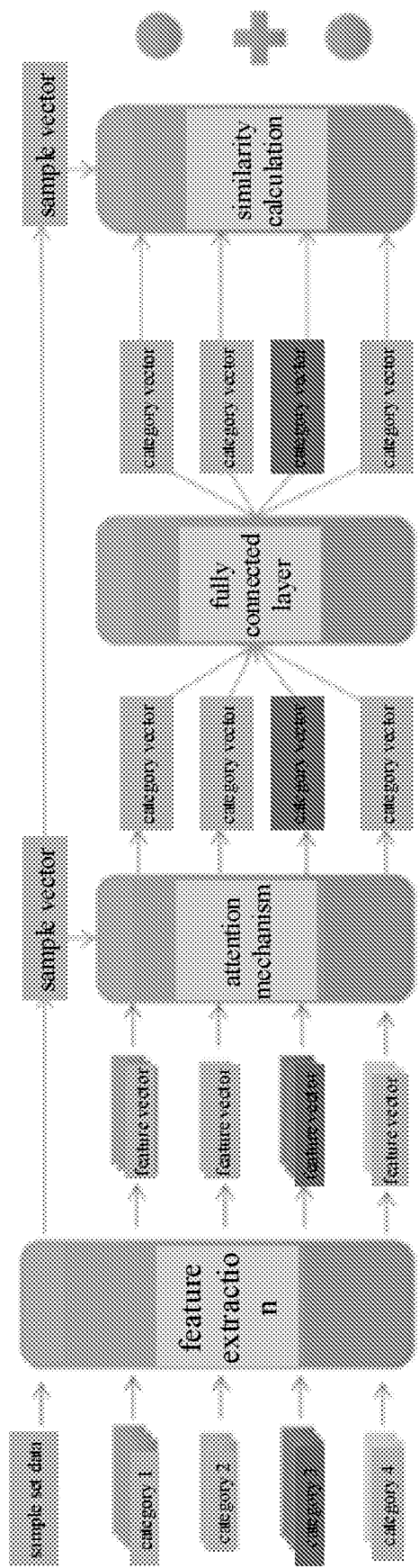
FIG. 2 is a schematic diagram illustrating supporting sentences of different categories.

The supporting sentence labeled with an intention category may be any sentence that labeled with an intention category. It should be noted that, as illustrated in FIG. 2, supporting sentences can be classified into a plurality of different categories according to existing labels.

In S102, the sample sentence and the plurality of supporting sentences are input into a trained intention recognition model, in which the trained intention recognition model is configured to generate a sample sentence vector corresponding to the sample sentence and category vectors corresponding to the plurality of supporting sentences based on the sample sentence and the plurality of supporting sentences, calculate matching degrees between the sample sentence vector and the category vectors, and obtain a predicted intention category of the sample sentence based on the matching degrees.

It should be noted that the recognition of a dialogue intention is essentially a classification task. Common intention recognition models mainly include the following two categories. One is the intention recognition model based on classification ideas, that is, the sample sentence with the intention category to be predicted is input into the model, and the model directly gives an intention label corresponding to the sample sentence; the other is the intention recognition model based on matching ideas, that is, the input sample sentence and each supporting sentence labeled with the intention category form a pair wise to obtain a number of pair wises, and then each pair wise is input into the intention recognition model which provides a matching score of each pair wise and selects the pair wise with the highest score, and an intention category corresponding to the supporting sentence in the pair wise with the highest score is used as the predicted intention category of the sample sentence.

However, because labeling a large number of sentences is time-consuming and labor-intensive, in the process of recognizing a dialogue intention, usually a small number of samples having the supporting sentences labeled with the intention category. In other words, in the process of recognizing a dialogue intention, it is usually required to perform few shot learning based on a small number of supporting sentences.

In the related art, the problem of "Domain Shift" is common in few shot learning. When the source field and the target field have quite different data distribution, knowledge that has been learned cannot be applied to the new field, and an effect of few shot learning is often not good.

Therefore, in the present disclosure, in order to alleviate the problem of "Domain Shift", avoid the overfitting phenomenon caused by few shot learning which reduces an accuracy of the recognition of a dialogue intention, the method for recognizing a dialogue intention proposed in the present disclosure can apply a DL technology based on few shots to the recognition of the dialogue intention, and a degree of dependence of the intention recognition model based on matching ideas on the scale of supporting sentences can be reduced.

The overfitting phenomenon refers to a phenomenon that the assumption becomes too strict in order to obtain a consistent assumption.

The intention recognition model proposed in the present disclosure is different from the existing intention recognition model based on matching ideas. It constructs vector pairs of the sample sentence with the intention category to be predicted and the intention categories, calculates a score of each vector pair and selects the intention category with the highest score to obtain the predicted intention category of the sample sentence. Alternatively, the obtained sample sentence and supporting sentences are used as the input, which are input into a pre-trained intention recognition model to obtain the predicted intention category of the sample sentence.

According to the method for recognizing a dialogue intention in the embodiments of the present disclosure, a sample sentence with an intention category to be predicted and a plurality of supporting sentences each labeled with intention category are obtained; the sample sentence and the supporting sentences are input into a pre-trained intention recognition model, in which the pre-trained intention recognition model generates a sample sentence vector corresponding to the sample sentence and category vectors corresponding to the supporting sentences according to the sample sentence and the supporting sentences, calculates matching degrees between the sample sentence vector and the category vectors, and obtains a predicted intention category of the sample sentence according to the matching degrees. Therefore, the present disclosure combines the few shot learning technology, which may reduce the degree of dependence of the intention recognition model on the scale of the supporting sentences, avoid the overfitting phenomenon caused by a few of supporting sentences each labeled with the intention category, ensure the accuracy of the recognition of a dialogue intention, improve the ability of quickly recognizing a dialogue intention, and improve the reliability and efficiency in the recognition of a dialogue intention.

It should be noted that, in the present disclosure, when trying to generate the category vectors corresponding to the supporting sentences based on the sample sentence and the supporting sentences, a feature extraction and category vector generation processing can be combined to generate the category vectors corresponding to the supporting sentences.

Figure 3:
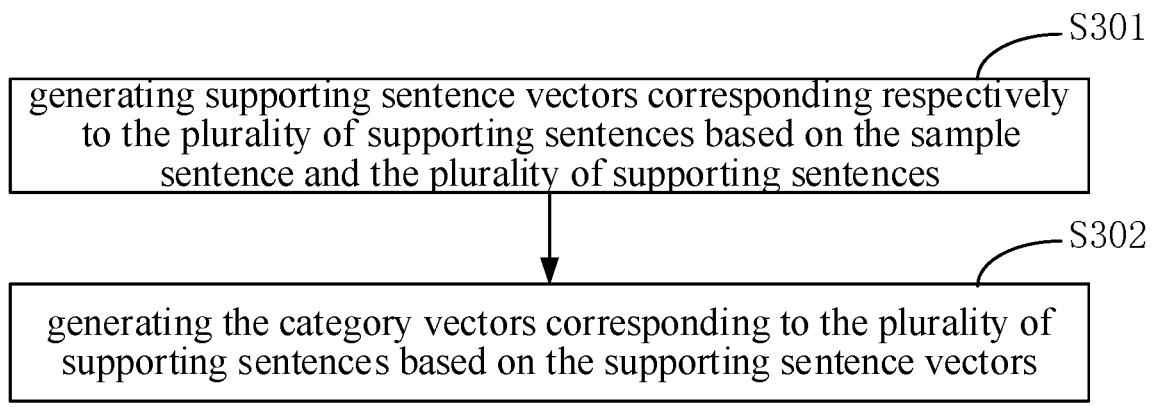
FIG. 3 is a flow chart illustrating a method for recognizing a dialogue intention according to a second embodiment of the present disclosure.

FIG. 3 is a flow chart illustrating a method for recognizing a dialogue intention according to a second embodiment of the present disclosure. As illustrated in FIG. 3, on the basis of the previous embodiment, the process of generating category vectors corresponding to the plurality of supporting sentences based on the sample sentence and the plurality of supporting sentences includes the following blocks.

In S301, supporting sentence vectors corresponding respectively to the plurality of supporting sentences are generated based on the sample sentence and the plurality of supporting sentences.

It should be noted that, in ML (Machine Learning), feature learning or representation learning is a collection of technologies for learning a feature, i.e., converting raw data into a form that can be effectively developed by machine learning. In the embodiments of the present disclosure, natural language text can be serialized in combination with the feature extraction processing using the representation learning technology, and a vector representation of the text is obtained through a deep network model, i.e., the supporting sentence vectors corresponding to the supporting sentences.

Figure 4:
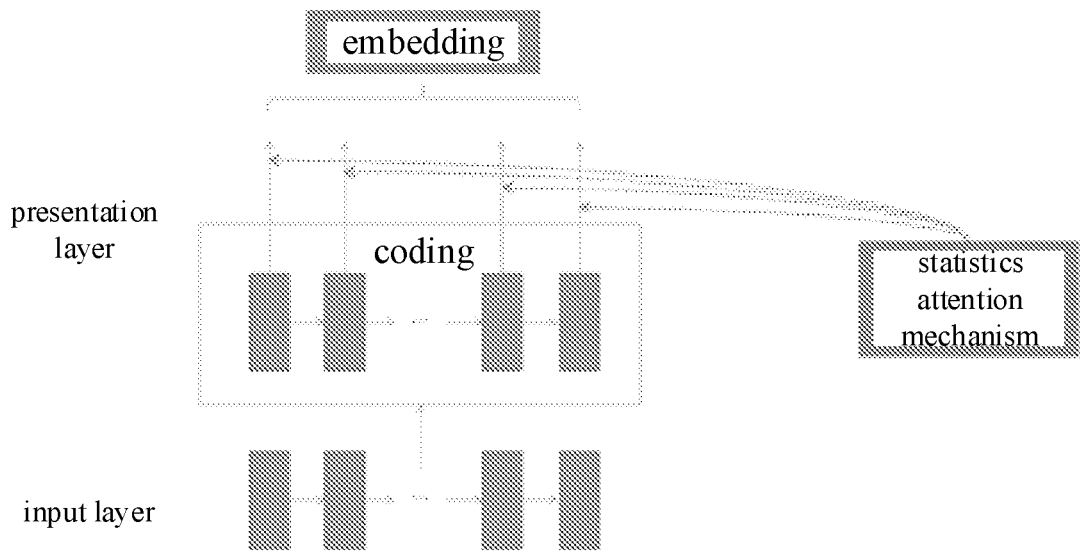
FIG. 4 is a schematic diagram illustrating a feature extraction process.

As illustrated in FIG. 4, the feature extraction processing mainly includes input layer processing and presentation layer processing.

The input layer is composed of features of multiple granularities. The input layer includes word segmentation, part-of-speech labeling and named entity recognition, and word vectors with mixed features can be obtained through vector mapping. In the embodiments of the present disclosure, the input layer uses a variety of different features, which can provide a variety of different prior information for the intention recognition model.

The presentation layer is mainly composed of a query encoder and a variety of attention mechanisms. In the embodiments of the present disclosure, the query encoder can extract deep semantic information from shallow semantic features of a sentence to vectorize the sentence so as to obtain a sentence vector.

It should be noted that a specific selection of the query encoder is not limited in the present disclosure, and can be set according to actual conditions. Alternatively, a common model based on LSTM (Long Short Term Memory) can be used as a query encoder.

In S302, the category vectors corresponding to the plurality of supporting sentences are generated based on the supporting sentence vectors.

It should be noted that, supporting sentences can be classified into a plurality of different categories according to existing labels, and each category has uncertain number of sentences. The category vector refers to a vector composed of feature vectors of the same label, which can be represented by a weighted sum of feature vectors.

According to the method for recognizing a dialogue intention of the embodiments of the present disclosure, the supporting sentence vectors corresponding to the supporting sentences can be generated according to the sample sentence and the supporting sentences, and the category vectors corresponding to the supporting sentences can be generated according to the supporting sentence vectors, so as to mitigate the problem of domain shift based on a plurality of attention mechanisms and the introduction of a prior measurement method, improve the effect of the intention recognition model on new field data, and further improve the reliability and efficiency of the recognition of a dialogue intention.

In the embodiments of the present disclosure, for each supporting sentence, after the supporting sentence vector corresponding to the supporting sentence is generated according to the sample sentence and the supporting sentence, a weighted sum of feature vectors corresponding to the supporting sentence can be obtained according to the supporting sentence vector, in which the weighted sum can be used as the corresponding category vector.

Figure 5:
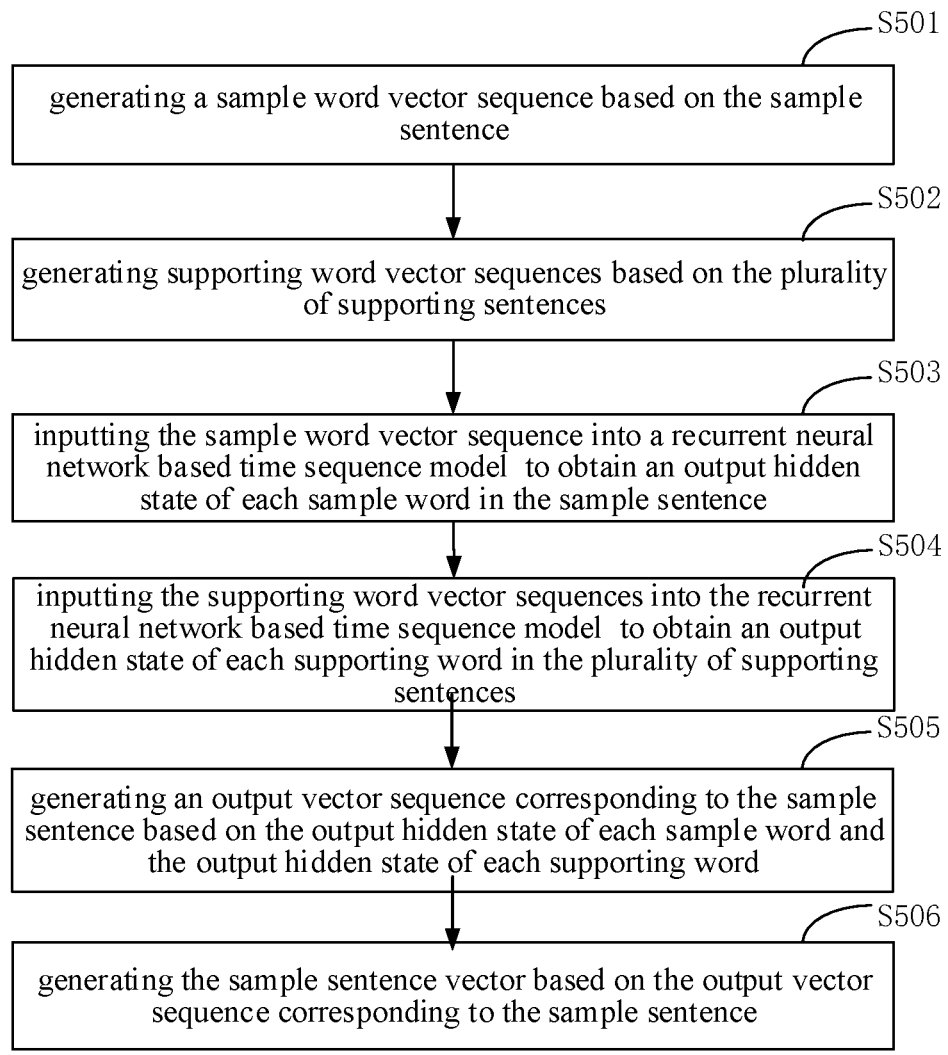
FIG. 5 is a flow chart illustrating a method for recognizing a dialogue intention according to a third embodiment of the present disclosure.

As a possible implementation, as illustrated in FIG. 5, on the basis of the previous embodiment, the process of generating the sample sentence vector corresponding to the sample sentence based on the sample sentence and the plurality of supporting sentences in the above block 301 includes the following blocks.

In S501, a sample word vector sequence is generated based on the sample sentence.

Alternatively, the sample word vector sequence corresponding to the sample sentence can be generated by performing word segmentation processing, parts-of-speech labeling, and named entity recognition on the sample sentence.

In S502, supporting word vector sequences are generated based on the plurality of supporting sentences.

Alternatively, the supporting word vector sequence corresponding to a supporting sentence can be generated by performing word segmentation processing, parts-of-speech labeling, and named entity recognition on the supporting sentence.

In S503, the sample word vector sequence is input into a recurrent neural network based time sequence model to obtain an output hidden state of each sample word in the sample sentence.

In the embodiments of the present disclosure, the sample word vector sequence may be used as the input, which is input into the recurrent neural network based time sequence model, such as LSTM model, to obtain the output hidden state of each sample word in the sample sentence.

Alternatively, the sample word vector sequence can be input into the LSTM model, and the output hidden state of each sample word in the sample sentence can be obtained by inputting the sample word vector sequence after standardized processing into the hidden layer.

In S504, the supporting word vector sequences are input into the recurrent neural network based time sequence model to obtain an output hidden state of each supporting word in the plurality of supporting sentences.

In the embodiments of the present disclosure, the supporting word vector sequences may be used as the input, which are input into the recurrent neural network based time sequence model, such as LSTM model, to obtain the output hidden state of each supporting word in the supporting sentences.

Alternatively, the supporting word vector sequences can be input into the LSTM model, and the output hidden state of each supporting word in the supporting sentences can be obtained by inputting the supporting word vector sequences after standardized processing into the hidden layer.

In S505, an output vector sequence corresponding to the sample sentence is generated based on the output hidden state of each sample word and the output hidden state of each supporting word.

In the embodiments of the present disclosure, an inter sentence attention mechanism can be applied between the sample sentence and the supporting sentence to obtain an influence between the sample sentence and the supporting sentence.

For example, the sample sentence Q is composed of q words, and the supporting sentence S is composed of s words. After the LSTM model, the output hidden state of each word in the sample sentence Q is $hq_i$, where i represents i-th word in the sample sentence Q, and the output hidden state of each word in the supporting sentence S is $hs_j$, where j represents j-th word in the supporting sentence S.

Alternatively, a similarity formula is configured based on the cosine distance, and a similarity between the output hidden state of each word in the sample sentence Q and the output hidden state of each word in the supporting sentence S can be obtained to obtain a similarity matrix A of q*s.

Further, for an output vector of the i-th word in the sample sentence Q and an output vector of the j-th word in the supporting sentence S, the following formula can be used to generate the output vector sequence corresponding to the sample sentence:

$$hq_i = \sum_{j=1}^{s'} a_{ij} hs_j$$

The $a_{ij}$ is the similarity between the output hidden state of the i-th word of the sample sentence Q and the output hidden state of the j-th word of the supporting sentence S, S' represents the number of words in the supporting sentence S.

In S506, the sample sentence vector is generated based on the output vector sequence corresponding to the sample sentence.

In the embodiments of this present disclosure, a statistics attention mechanism can be introduced in the presentation layer, and the output vector sequences corresponding to the supporting sentences can be weighted in turn, and the sequence vectors are converted into sentence vectors to generate the supporting sentence vectors.

Figure 6:
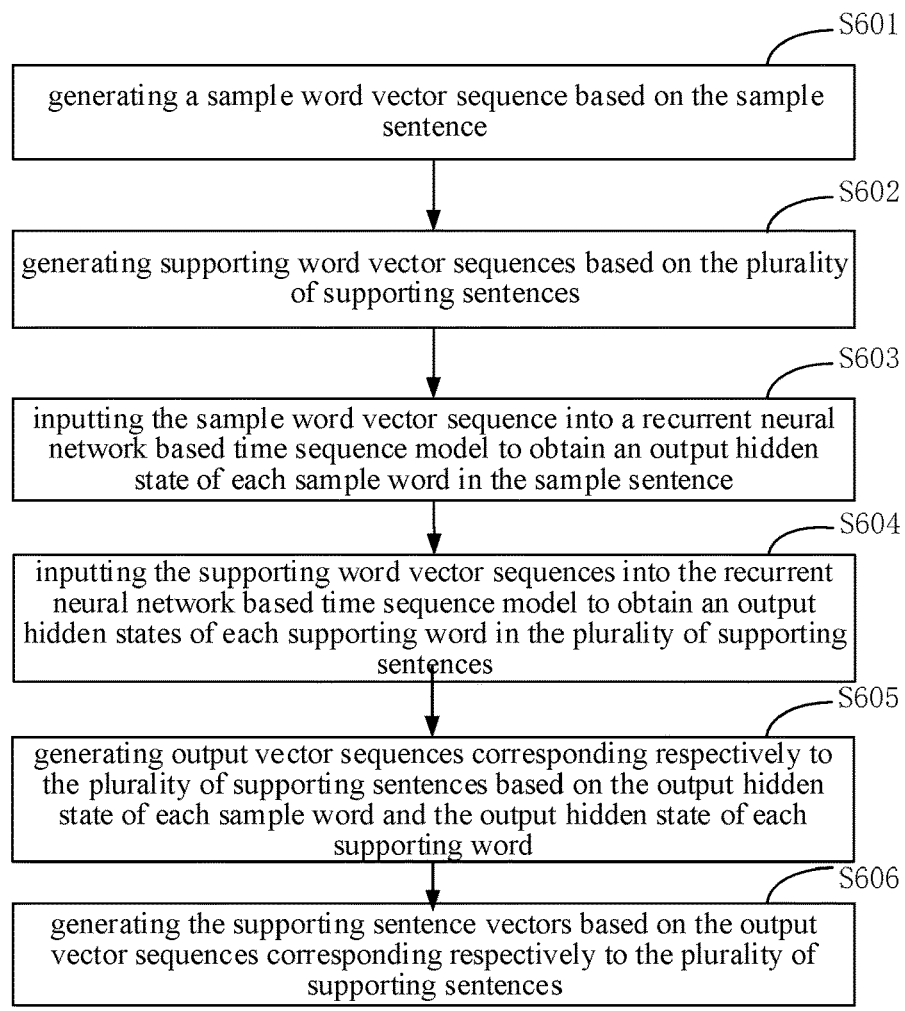
FIG. 6 is a flow chart illustrating a method for recognizing a dialogue intention according to a fourth embodiment of the present disclosure.

As a possible implementation, as illustrated in FIG. 6, on the basis of the previous embodiment, the process of generating the supporting sentence vectors corresponding respectively to the plurality of supporting sentences based on the sample sentence and the plurality of supporting sentences in S301 includes the following blocks.

In S601, a sample word vector sequence is generated based on the sample sentence.

In S602, supporting word vector sequences are generated based on the plurality of supporting sentences.

In S603, the sample word vector sequence is input into a recurrent neural network based time sequence model to obtain an output hidden state of each sample word in the sample sentence.

In S604, the supporting word vector sequences are input into the recurrent neural network based time sequence model to obtain an output hidden state of each supporting word in the plurality of supporting sentences.

In S605, output vector sequences corresponding respectively to the plurality of supporting sentences are generated based on the output hidden state of each sample word and the output hidden state of each supporting word.

The blocks S601 to S605 are the same as the blocks S501 to S505 in the above embodiments, and will not be elaborated here.

In S606, the supporting sentence vectors are generated based on the output vector sequences corresponding respectively to the plurality of supporting sentences.

In the embodiments of this present disclosure, a statistics attention mechanism can be introduced in the presentation layer, and the output vector sequence corresponding to the sample sentence can be weighted in turn, and the sequence vector is converted into the sentence vector to generate the sample sentence vector.

According to the method for recognizing a dialogue intention of the embodiments of the present disclosure, a corresponding sample word vector sequence is generated according to the sample sentence; corresponding supporting word vector sequences are generated according to the supporting sentences; the sample word vector sequence is input into a recurrent neural network based time sequence model to obtain an output hidden state of each sample word in the sample sentence; the supporting word vector sequences are input into the recurrent neural network based time sequence model to obtain the output hidden state of each supporting word in the supporting sentences; the output vector sequence corresponding to the sample sentence and the output vector sequences corresponding to the supporting sentences are generated according to the output hidden state of each sample word and the output hidden state of each supporting word; and further the sample sentence vector is generated according to the output vector sequence corresponding to the sample sentence and the supporting sentence vectors are generated according to the output vector sequences corresponding to the supporting sentences, so that the present disclosure represents the output sequence vectors of the sample sentence Q and the supporting sentence S respectively. Interaction is added between the two sentences and interactive information is incorporated, which further improves the reliability and efficiency of the recognition of a dialogue intention.

It should be noted that, in the present disclosure, the input layer processing can respectively process the input sample sentence and supporting sentences to obtain word vector sequences with mixed features.

The following explains the generation process of the word vector sequences of the sample sentence and the supporting sentence respectively.

Figure 7:
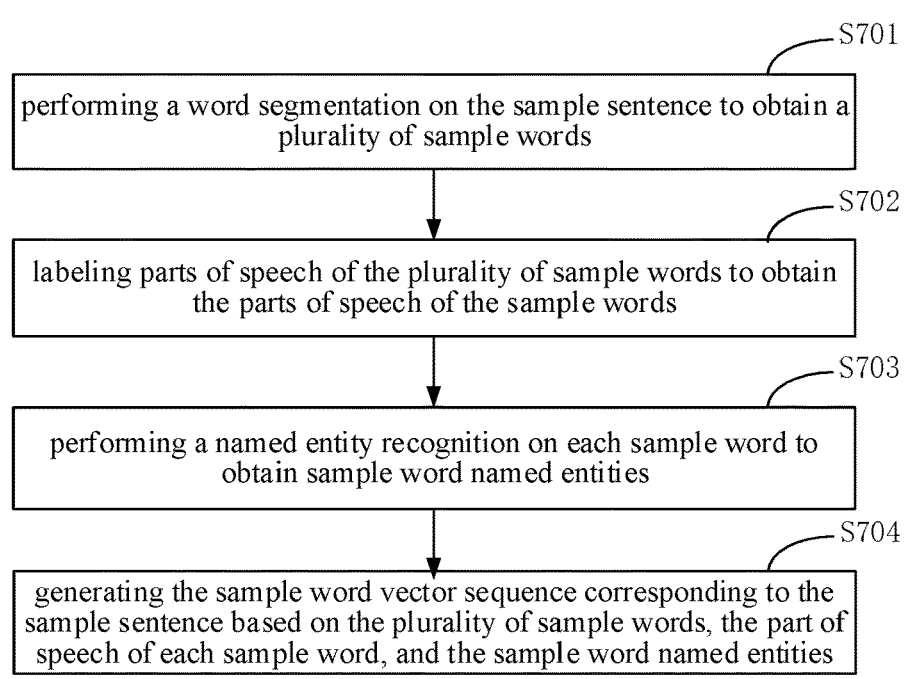
FIG. 7 is a flow chart illustrating a method for recognizing a dialogue intention according to a fifth embodiment of the present disclosure.

As for the sample sentence, as a possible implementation, as illustrated in FIG. 7, on the basis of the previous embodiment, the process of generating a sample word vector sequence based on the sample sentence in S501 includes the following blocks.

In S701, a word segmentation is performed on the sample sentence to obtain a plurality of sample words.

Alternatively, the sample sentence can be segmented according to a preset word segmentation processing rule to obtain a plurality of sample words. The preset word segmentation processing rule can be set according to actual conditions. A specific method of performing the word segmentation on the sample sentence according to the preset word segmentation processing rule can be implemented by any existing method, and will not be elaborated here.

For example, for the sample sentence Q, the sample sentence Q can be divided into q words according to the preset word segmentation processing rule.

In S702, parts of speech of the sample words are determined.

Alternatively, the sample words can be input into a pre-trained part-of-speech labeling model to obtain the parts of speech of the sample words. A specific method of inputting the sample words into the pre-trained part-of-speech labeling model to perform part-of-speech labeling on the sample words can be implemented by any existing method, and will not be elaborated here.

In S703, a named entity recognition is performed on each sample word to obtain sample word named entities.

Alternatively, the sample words can be input into a pre-trained named entity recognition model to obtain the sample word named entities. A specific method of inputting the sample words into the pre-trained named entity recognition model to perform the named entity recognition on the sample words can be implemented by any existing method, and will not be elaborated here.

In S704, the sample word vector sequence corresponding to the sample sentence is generated based on the plurality of sample words, the part of speech of each sample word, and the sample word named entities.

Figure 8:
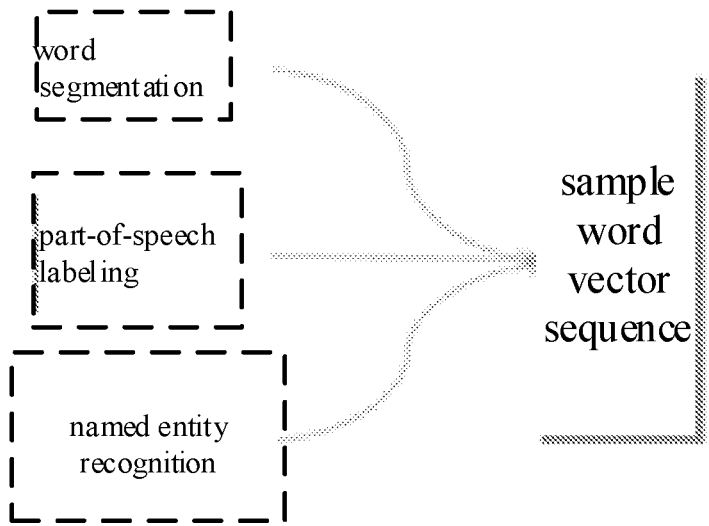
FIG. 8 is a schematic diagram illustrating a process of generating a sample word vector sequence.

It should be noted that each word corresponds to a word vector, and each sentence corresponds to a word vector sequence. Therefore, in the embodiments of the present disclosure, as illustrated in FIG. 8, after obtaining the sample words, the parts of speech of the sample words, and the sample word named entities, the vector mapping can be performed according to the sample words, the parts of speech of the sample words, and the sample word named entities to obtain a sample word vector sequence corresponding to the sample sentence and having mixed features.

Figure 9:
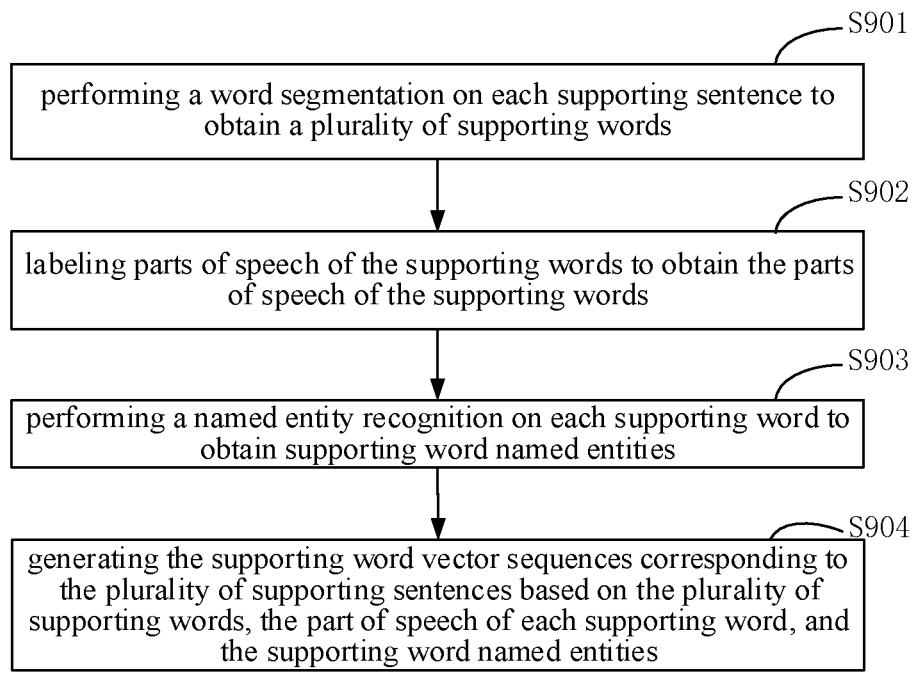
FIG. 9 is a flow chart illustrating a method for recognizing a dialogue intention according to a sixth embodiment of the present disclosure.

As for the supporting sentence, as a possible implementation, as illustrated in FIG. 9, on the basis of the previous embodiment, the process of generating supporting word vector sequences based on the plurality of supporting sentences in S502 includes the following blocks.

In S901, a word segmentation is performed on each supporting sentence to obtain a plurality of supporting words.

Alternatively, each supporting sentence can be segmented according to a preset word segmentation processing rule to obtain a plurality of supporting words. The preset word segmentation processing rule can be set according to actual conditions. A specific method of performing the word segmentation on the supporting sentences according to the preset word segmentation processing rule can be implemented by any existing method, and will not be elaborated here.

For example, for the supporting sentence S, the supporting sentence S can be divided into s words according to the preset word segmentation processing rule.

In S902, parts of speech of the supporting words are determined.

Alternatively, the supporting words can be input into a pre-trained part-of-speech labeling model to obtain the parts of speech of the supporting words. A specific method of inputting the supporting words into the pre-trained part-of-speech labeling model to perform part-of-speech labeling on the supporting words can be implemented by any existing method, and will not be elaborated here.

In S903, a named entity recognition is performed on each supporting word to obtain supporting word named entities.

Alternatively, the supporting words can be input into a pre-trained named entity recognition model to obtain the supporting word named entities. A specific method of inputting the supporting words into the pre-trained named entity recognition model to perform the named entity recognition on the supporting words can be implemented by any existing method, and will not be elaborated here.

In S904, the supporting word vector sequences corresponding to the plurality of supporting sentences are generated based on the plurality of supporting words, the part of speech of each supporting word, and the supporting word named entities.

In the embodiments of the present disclosure, for each supporting sentence, after obtaining the supporting words, the parts of speech of the supporting words, and the supporting word named entities, the vector mapping can be performed according to the supporting words, the parts of speech of the supporting words, and the supporting word named entities to obtain supporting word vector sequence corresponding to the supporting sentence and having mixed features.

According to the method for recognizing a dialogue intention of the embodiments of the present disclosure, the input sample sentence and supporting sentences can be segmented respectively, part-of-speech labeling and named entity recognition can be performed on each word obtained by segmentation, and a word vector sequence with mixed features can be obtained by vector mapping based on the above three features.

It should be noted that, in the present disclosure, the sentence vector can be obtained from the sequence vector based on the statistics attention mechanism.

The following explains the generation process of the sentence vectors of the sample sentence and the supporting sentence respectively.

Figure 10:
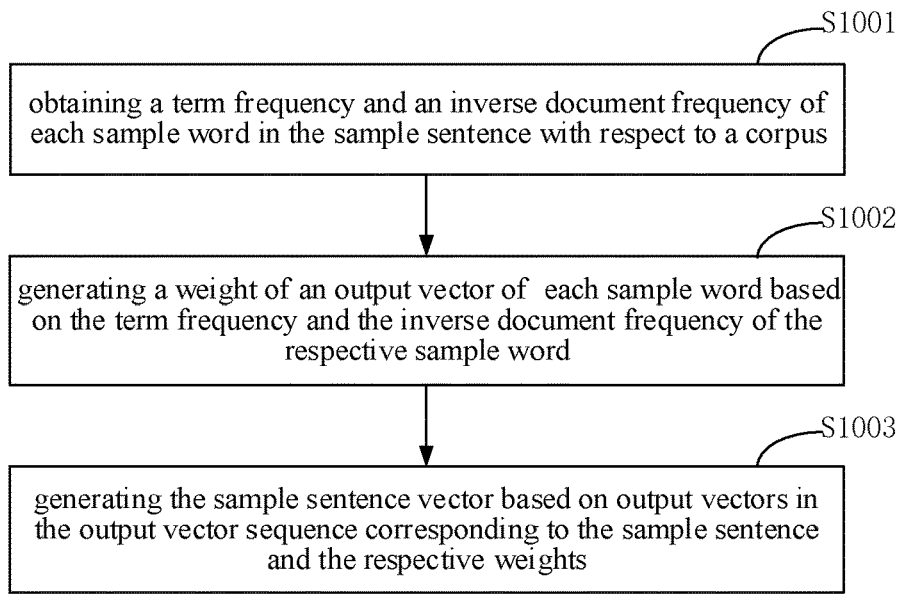
FIG. 10 is a flow chart illustrating a method for recognizing a dialogue intention according to a seventh embodiment of the present disclosure.

As for the sample sentence, as a possible implementation, as illustrated in FIG. 10, on the basis of the previous embodiment, the process of generating a sample sentence vector based on the output vector sequence corresponding to the sample sentence in S606 includes the following blocks.

In S1001, a term frequency and an inverse document frequency of each sample word in the sample sentence with respect to a corpus are obtained.

In the embodiments of the present disclosure, statistics can be performed on the large-scale corpus in a meta-training stage to obtain the term frequency ($TF_{sample}$) and inverse document frequency ($IDF_{sample}$) of each sample word in the sample sentence with respect to the corpus. TF refers to the term frequency with respect to the corpus, not the term frequency with respect to an article.

Alternatively, the following formula can be used to obtain the $TF_{sample}$ by dividing the number of times the sample word appears in the corpus by the total number of words in the corpus:

$$TF_{sample} = \frac{\text{number of times the sample word appears in the corpus}}{\text{total number of words in the corpus}}$$

Alternatively, the following formula can be used to take the logarithm of the quotient of the total number of sentences in the corpus and the total number of sentences containing the sample word in the corpus with base 10 as the $IDF_{sample}$:

$$IDF_{sample} = lg\left(\frac{\text{total number of sentences in the corpus}}{\substack{\text{total number of sentences} \\ \text{containing the sample word in the corpus}}}\right)$$

In S1002, a weight of an output vector of each sample word is generated based on the term frequency and the inverse document frequency of the respective sample word.

It should be noted that according to the heavy-tailed distribution principle, a word that appears less frequently in the corpus tends to have a greater information entropy and have a greater impact on semantics; and a word that appears frequently is often a type with no actual meaning such as a function word and has less impact on semantics. It can be seen that the smaller the TF of a word in the corpus is, the greater the impact of the word is. Similarly, when a word appears in many sentences, it means that the word tends to have a greater information entropy. It can be seen that the smaller the document frequency of a word is, the greater the IDF is and the greater the impact is.

In the embodiments of the present disclosure, the statistical information $TF_{sample}$ and $IDF_{sample}$ can be combined by using the fully connected layer processing to obtain the weight of the output vector corresponding to the sample word based on the statistical information. Alternatively, the weight can be obtained by the following formula:

$$\text{Importance}_{sample} = \tanh(W1 * TF_{sample} + W2 * IDF_{sample} + b)$$

All of the parameters W1, W2, and b can be determined by training.

In S1003, the sample sentence vector is generated based on the output vectors in the output vector sequence corresponding to the sample sentence and the respective weights.

In the embodiments of the present disclosure, the sequence may be weighted according to the output vectors in the output vector sequence corresponding to the sample sentence and the corresponding weights to generate the sample sentence vector.

Figure 11:
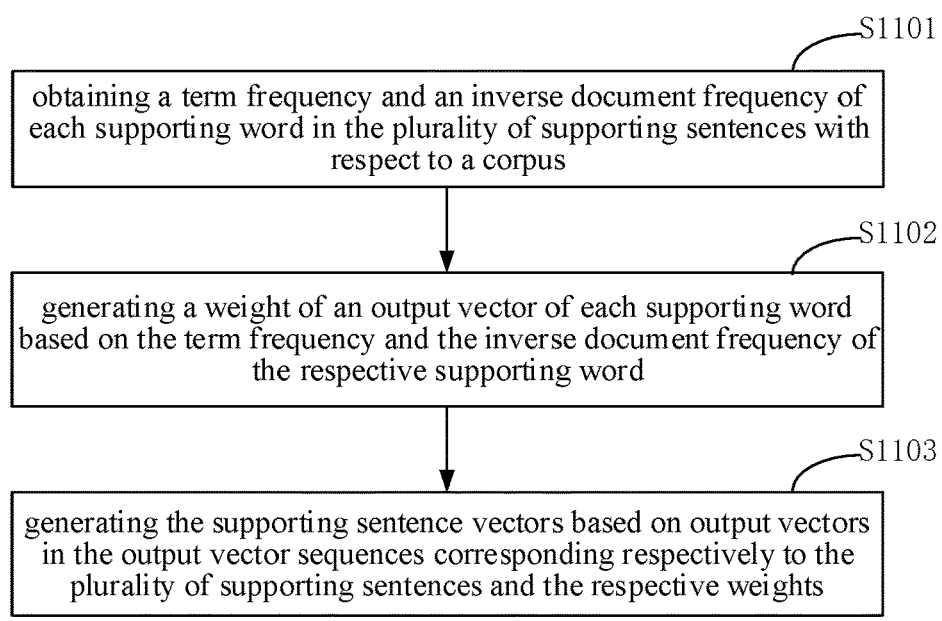
FIG. 11 is a flow chart illustrating a method for recognizing a dialogue intention according to an eighth embodiment of the present disclosure.

As for the supporting sentence, as a possible implementation, as illustrated in FIG. 11, on the basis of the previous embodiment, the process of generating supporting sentence vectors based on the output vector sequences corresponding respectively to the plurality of supporting sentence in S506 includes the following blocks.

In S1101, a term frequency and an inverse document frequency of each supporting word in the plurality of supporting sentences with respect to a corpus are obtained.

Alternatively, the following formula can be used to obtain the $TF_{supporting}$ by dividing the number of times the supporting word appears in the corpus by the total number of words in the corpus:

$$TF_{supporting} = \frac{\text{number of times the supporting word appears in the corpus}}{\text{total number of words in the corpus}}$$

Alternatively, the following formula can be used to take the logarithm of the quotient of the total number of sentences in the corpus and the number of sentences containing the supporting word in the corpus with the base 10 as the $IDF_{supporting}$:

$$IDF_{supporting} = lg\left(\frac{\text{total number of sentences in the corpus}}{\substack{\text{total number of sentences} \\ \text{containing the supporting word in the corpus}}}\right)$$

In S1102, a weight of an output vector of each the supporting word is generated based on the term frequency and the inverse document frequency of the respective supporting word.

In the embodiments of the present disclosure, the statistical information $TF_{supporting}$ and $IDF_{supporting}$ can be combined by using the fully connected layer processing to obtain the weight of the output vector corresponding to the supporting word based on the statistical information. Alternatively, the weight can be obtained by the following formula:

$$\text{Importance}_{supporting} = \tanh(W1 * TF_{supporting} + W2 * IDF_{supporting} + b)$$

In S1103, the supporting sentence vectors are generated based on the output vectors in the output vector sequences corresponding respectively to the plurality of supporting sentences and the respective weights.

In the embodiments of the present disclosure, the sequence may be weighted according to the output vectors in the output vector sequence corresponding to the supporting sentence and the corresponding weights to generate the supporting sentence vector.

According to the method for recognizing a dialogue intention of the embodiments of the present disclosure, the weight of each sequence vector can be obtained based on the TF, the IDF and a weight calculation formula by calculating the TF and IDF of each word of the sample sentence, and the TF and IDF of each word of the sample sentences, and the sequence is weighted in turn to obtain the sentence vectors of the sample sentence and the supporting sentences. Therefore, the present disclosure adopts a statistics attention mechanism to obtain sentence vectors according to sequence vectors, and integrates statistical information, so that sentence vectors can be better obtained, and the reliability and efficiency of the recognition of a dialogue intention are further improved.

Further, in the present disclosure, when trying to generate category vectors corresponding to supporting sentences based on the supporting sentence vectors, the category vector corresponding to the same intention category can be generated according to the supporting sentence vectors labeled with the same intention category.

Figure 12:
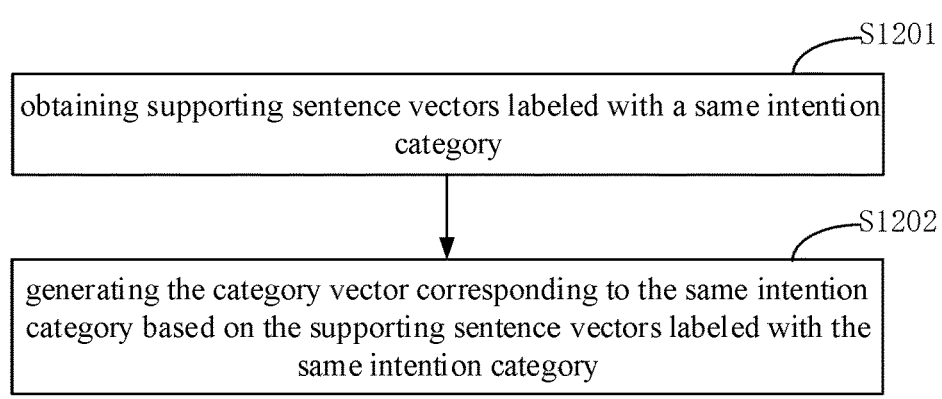
FIG. 12 is a flow chart illustrating a method for recognizing a dialogue intention according to a ninth embodiment of the present disclosure.

As a possible implementation, as illustrated in FIG. 12, on the basis of the previous embodiment, the process of generating a category vectors corresponding to the plurality of supporting sentences based on the supporting sentence vectors in S302 includes the following blocks.

In S1201, supporting sentence vectors labeled with a same intention category are obtained.

It should be noted that since the data can be classify into a plurality of intention categories according to labeled intention categories, each category corresponds to an uncertain number of supporting sentences. Therefore, in the embodiments of the present disclosure, after the feature extraction processing is performed, for each sentence, a corresponding feature vector is obtained. In this case, the supporting sentence vectors labeled with the same intention category can be obtained.

In S1202, the category vector corresponding to the same intention category is generated based on the supporting sentence vectors labeled with the same intention category.

Figure 13:
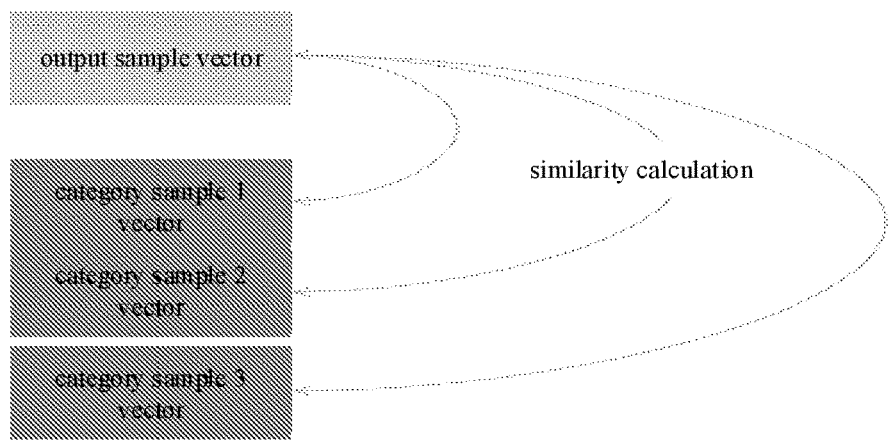
FIG. 13 is a schematic diagram illustrating a process of obtaining a category vector.

In the embodiments of the present disclosure, the attention layer is introduced in the category vector generation process, and a weight of the feature vector of each sentence can be obtained through the attention layer. As illustrated in FIG. 13, by calculating a cosine similarity between the input sample and each category sample vector, the weight of each category sample vector can be obtained. Furthermore, the category vector corresponding to the intention category can be obtained according to a weighted representation of the supporting sentence vectors labeled with the same intention category.

According to the method for recognizing a dialogue intention of the embodiments of the present disclosure, the supporting sentence vectors labeled with the same intention category can be obtained, the category vector corresponding to the same intention category is generated according to the supporting sentence vectors labeled with the same intention category. Therefore, the preset disclosure introduces the attention layer in the category vector generation process, the category vectors corresponding to different labeled intention categories can be accurately obtained through similarity calculation, which further improves the reliability and efficiency of the recognition of a dialogue intention.

It should be noted that, in the present disclosure, when trying to obtain the predicted intention category of the sample sentence based on the matching degrees, the predicted intention category can be determined according to a preset determination strategy. The preset determination strategy can be set according to the actual conditions.

As a possible implementation, the category vector of each supporting sentence and the sentence vector of the sample sentence can be scored to calculate the matching degree between the sample sentence and each supporting sentence, and the intention category labeled for the category vector corresponding to a maximum matching degree among the matching degrees is determined as the predicted intention category of the sample sentence.

Alternatively, after obtaining the category vectors and the sentence vector of the sample sentence, the score between each vector pair can be obtained, and the score value is between 0 and 1. Each task includes n supporting sentences each labeled with an intention category.

Furthermore, by performing the category vector generation process, n category vectors can be obtained, and then n vector pairs can be obtained. In this case, model inference and scoring can be performed on each vector pair, and the intention category labeled for the category vector corresponding to the largest matching degree among a plurality of matching degrees can be determined as the predicted intention category of the sample sentence.

It should be noted that a specific method for scoring vector pairs is not limited in the present disclosure, and can be set according to actual conditions.

Figure 14:
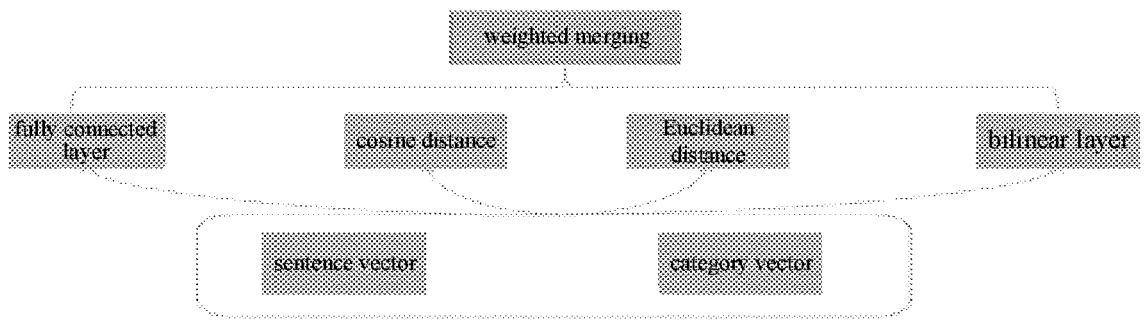
FIG. 14 is a schematic diagram illustrating a process of scoring a vector pair.

Alternatively, as illustrated in FIG. 14, when trying to score a vector pair, four similarity calculation methods can be used, and the above four similarity formulas are weighted and merged to obtain a result of scoring the vector pair.

The four similarity calculation methods are respectively explained below.

For the similarity calculation method based on the fully connected layer, the sentence vector of the sample sentence and the category vector can be spliced, and the similarity between the sentence vector of the sample sentence and the category vector can be obtained through the fully connected layer by using the Sigmod activation function.

Alternatively, the similarity $S_1$ can be obtained by the following formula:

$$S_1 = \mathrm{Sigmod}(W^* \mathrm{Concat}(Q,C))$$

The parameter W can be determined through training, Q represents the sentence vector of the sample sentence, and C represents the category vector.

For the similarity calculation method based on the cosine distance, the cosine distance formula can be used to calculate the similarity between the sentence vector of the sample sentence and the category vector.

Alternatively, the similarity S2 can be obtained by the following formula:

$$S_2 = \frac{Q*C}{\|Q\| * \|C\|}$$

For the similarity calculation method based on the Euclidean distance, the Euclidean distance formula can be used to calculate the similarity between the sentence vector of the sample sentence and the category vector. At the same time, in order to prevent the numerical explosion, an activation function can be added to scale the Euclidean distance value.

Alternatively, the similarity $S_3$ can be obtained by the following formula:

$$S_3 = \mathrm{Sigmod}\left(\sqrt{\sum_{i=1}^{n}(qi-si)^2}\right)$$

where qi represents the sentence vector of the sample sentence, and si represents the category vector.

For the similarity calculation method based on the bilinear layer, an intermediate parameter matrix can be introduced, so that the sentence vector Q of the sample sentence and the category vector S will interact, and the similarity score can be obtained.

Alternatively, the similarity $S_4$ can be obtained by the following formula:

$$S_4 = \text{Sigmod}(Q*W*S)$$

Furthermore, a fully connected layer can be introduced, and a plurality of different similarity scores can be weighted and merged by the following formula to obtain the final similarity $S_{final}$:

$$S_{final} = \text{Sigmod}\left(\sum_{j=1}^{4} w * Si\right)$$

According to the method for recognizing a dialogue intention of the embodiments of the present disclosure, the category vectors and the sentence vector of the sample sentence can be scored to calculate the matching degrees between the sample sentence and the supporting sentences, and the intention category labeled for the category vector corresponding to a maximum matching degree among a plurality of matching degrees is determined as the predicted intention category of the sample sentence, which ensures the accuracy of the predicted intention category, and further improves the reliability and efficiency of the recognition of a dialogue intention.

Figure 15:
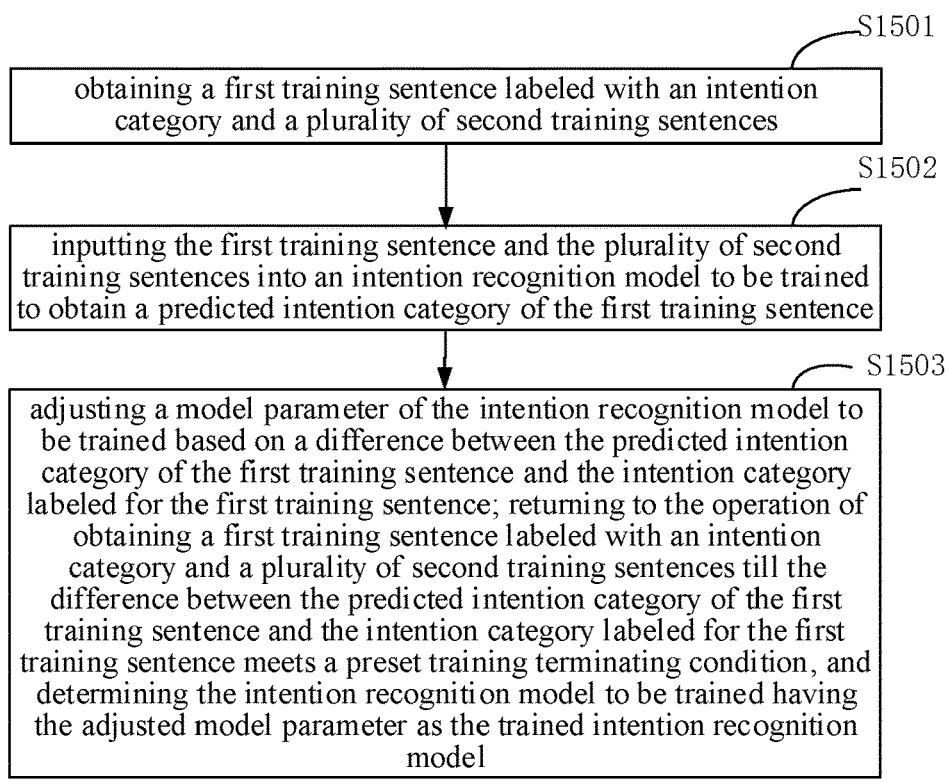
FIG. 15 is a flow chart illustrating a method for recognizing a dialogue intention according to a tenth embodiment of the present disclosure.

It should be noted that in the present disclosure, the intention recognition model is obtained by pre-training. In the embodiments of the present disclosure, as illustrated in FIG. 15, the intention recognition model can be established in advance in the following method.

In S1501, a first training sentence labeled with an intention category and a plurality of second training sentences are obtained.

The first training sentence and the second training sentences can be collected in advance for subsequent model training. The number of second training sentences can be preset, for example, 100 second training sentences are obtained.

In S1502, the first training sentence and the second training sentences are input into an intention recognition model to be trained to obtain a predicted intention category of the first training sentence.

In the embodiments of the present disclosure, the first training sentence and the second training sentences may be used as the input, which are input into the intention recognition model to be trained, and the model may output the predicted intention category of the first training sentence.

In S1503, a model parameter of the intention recognition model to be trained is adjusted based on a difference between the predicted intention category of the first training sentence and the intention category labeled for the first training sentence, and the process jumps to the operation of obtaining a first training sentence labeled with an intention category and a plurality of second training sentences to proceed till the difference between the predicted intention category of the first training sentence and the intention category labeled for the first training sentence meets a preset training terminating condition, and the intention recognition model to be trained having the adjusted model parameter is determined as the trained intention recognition model.

The preset training terminating condition can be set according to actual conditions.

It should be noted that, at the model level, the training sentences and the predicted intention categories corresponding to the training sentences involved in the intention recognition model in the present disclosure are a relatively closed geometry. As long as the preliminary data is sufficiently prepared, the training sentences and the prediction intention category set corresponding to the training sentences can be considered as a relatively complete set to ensure completeness of the predicted intention categories corresponding to the training sentences and the training sentences. In terms of the feasibility of model training, the physical meaning and dependency of the input and output of each block in the model are clear, and there are a large number of mature solutions to model such dependency, so the model is trainable and is expected to be able to converge.

Corresponding to the method recognizing a dialogue intention provided in the above embodiments, an apparatus for recognizing a dialogue intention is provided in an embodiment of the present disclosure. Because the apparatus for recognizing a dialogue intention provided in the embodiments of the present disclosure is similar to the method for recognizing a dialogue intention in the above embodiments, the implementation of the method for recognizing a dialogue intention is also applicable to the apparatus for recognizing a dialogue intention provided in this embodiment, and will not be elaborated in detail in this embodiment.

Figure 16:
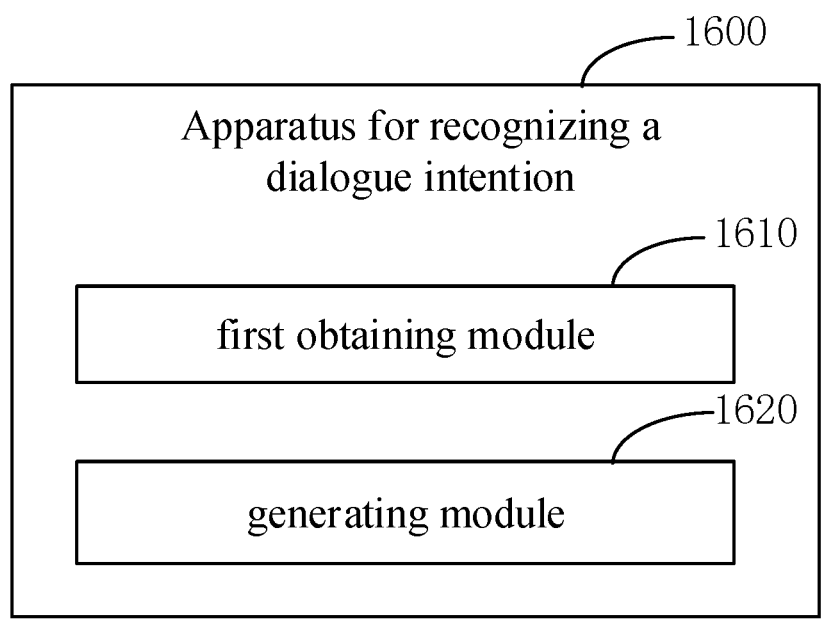
FIG. 16 is a block diagram illustrating an apparatus for recognizing a dialogue intention for executing the method for recognizing a dialogue intention according to an embodiment of the present disclosure.

FIG. 16 is a block diagram illustrating an apparatus for recognizing a dialogue intention according to an embodiment of the present disclosure.

As illustrated in FIG. 16, the apparatus 1600 for recognizing a dialogue intention includes a first obtaining module 1610 and a generating module 1620.

The first obtaining module 1610 is configured to obtain a sample sentence with an intention category to be predicted and a plurality of supporting sentences each labeled with an intention category.

The generating module 1620 is configured to input the sample sentence and the plurality of supporting sentences into a trained intention recognition model, in which the trained intention recognition model is configured to generate a sample sentence vector corresponding to the sample sentence and category vectors corresponding to the plurality of supporting sentences based on the sample sentence and the plurality of supporting sentences, calculate matching degrees between the sample sentence vector and the category vectors, and obtain a predicted intention category of the sample sentence based on the matching degrees.

Figure 17:
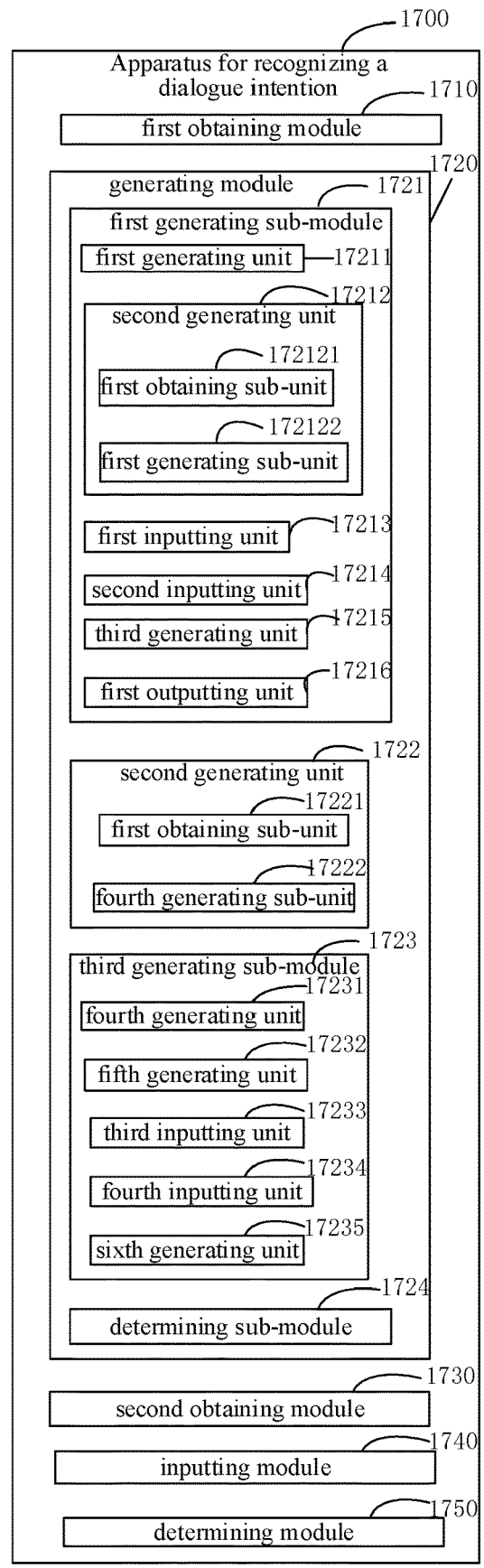
FIG. 17 is a block diagram illustrating an apparatus for recognizing a dialogue intention for executing the method for recognizing a dialogue intention according to an embodiment of the present disclosure.

FIG. 17 is a block diagram illustrating an apparatus for recognizing a dialogue intention according to another embodiment of the present disclosure.

As illustrated in FIG. 17, the apparatus 1700 for recognizing a dialogue intention includes a first obtaining module 1710 and a generating module 1720.

The generating module 1720 includes a first generating sub-module 1721 and a second generating sub-module 1722.

The first generating sub-module 1721 is configured to generate supporting sentence vectors corresponding respectively to the plurality of supporting sentences based on the sample sentence and the supporting sentences.

The second generating sub-module 1722 is configured to generate the category vectors corresponding to the plurality of supporting sentences based on the supporting sentence vectors.

Alternatively, the first generating sub-module 1721 includes a first generating unit 17211, a second generating unit 17212, a first inputting unit 17213, a second inputting unit 17214, a third generating unit 17215, and a first outputting unit 17216.

The first generating unit 17211 is configured to generate a sample word vector sequence based on the sample sentence.

The second generating unit 17212 is configured to generate supporting word vector sequences based on the plurality of supporting sentences.

The first inputting unit 17213 is configured to input the sample word vector sequence into a recurrent neural network based time sequence model to obtain an output hidden state of each sample word in the sample sentence.

The second inputting unit 17214 is configured to input the supporting word vector sequences into the recurrent neural network based time sequence model to obtain an output hidden state of each supporting word in the plurality of supporting sentences.

The third generating unit 17215 is configured to generate the output vector sequence corresponding respectively to the plurality of supporting sentences based on the output hidden state of each sample word and the output hidden state of each supporting word.

The first outputting unit 17216 is configured to generate the supporting sentence vectors based on the output vector sequences corresponding respectively to the plurality of supporting sentences.

Alternatively, the generating module 1720 further includes a third generating sub-module 1723, which includes a fourth generating unit 17231, a fifth generating unit 17232, a third inputting unit 17233, a fourth inputting unit 17234, a sixth generating unit 17235, and a second outputting unit 17236.

The fourth generating unit 17231 is configured to generate a sample word vector sequence based on the sample sentence.

The fifth generating unit 17232 is configured to generate supporting word vector sequences based on the plurality of supporting sentences.

The third inputting unit 17233 is configured to input the sample word vector sequence into a recurrent neural network based time sequence model to obtain an output hidden state of each sample word in the sample sentence.

The fourth inputting unit 17234 is configured to input the supporting word vector sequences into the recurrent neural network based time sequence model to obtain an output hidden state of each supporting word in the plurality of supporting sentences.

The sixth generating unit 17235 is configured to generate an output vector sequence corresponding to the sample sentence based on the output hidden state of each sample word and the output hidden state of each supporting word.

The second outputting unit 17236 is configured to generate the sample sentence vector based on the output vector sequence corresponding to the sample sentence.

Further, the first generating unit 17211 and the fourth generating unit 17231 are also configured to: perform a word segmentation on the sample sentence to obtain a plurality of sample words; label parts of speech of the sample words to obtain the parts of speech of the sample words; perform a named entity recognition on each sample word to obtain sample word named entities; and generate the sample word vector sequence corresponding to the sample sentence based on the plurality of sample words, the part of speech of each sample word, and the sample word named entities.

Further, the second generating unit 17212 and the fifth generating unit 17232 are also configured to: perform a word segmentation on each supporting sentence to obtain a plurality of supporting words; label parts of speech of the supporting words to obtain the parts of speech of the supporting words; perform a named entity recognition on each supporting word to obtain supporting word named entities; and generate the supporting word vector sequences corresponding to the plurality of supporting sentences based on the plurality of supporting words, the part of speech of each supporting word, and the supporting word named entities.

Further, the second outputting sub-unit 17236 is also configured to: obtain a term frequency and an inverse document frequency of each sample word in the sample sentence with respect to a corpus; generate a weight of an output vector of each sample word based on the term frequency and the inverse document frequency of the respective sample word; and generate the sample sentence vector based on output vectors in the output vector sequence corresponding to the sample sentence and the respective weights.

Further, the first outputting sub-unit 17216 is also configured to: obtain a term frequency and an inverse document frequency of each supporting word in the plurality of supporting sentences with respect to a corpus; generate a weight of an output vector of each supporting word based on the term frequency and the inverse document frequency of the respective supporting word; and generate the supporting sentence vectors based on output vectors in the output vector sequences corresponding respectively to the plurality of supporting sentences and the respective weights.

Further, the second generating unit 17212 includes a first obtaining sub-unit 172121 and a first generating sub-unit 172122.

The first obtaining sub-unit 172121 is configured to obtain supporting sentence vectors labeled with a same intention category.

The first generating sub-unit 172122 is configured to generate the category vector corresponding to the same intention category based on the supporting sentence vectors labeled with the same intention category.

Further, the generating module 1720 also includes a determining sub-module 1724. The determining sub-module 1724 is configured to determine the intention category labeled for the category vector corresponding to a maximum matching degree among the matching degrees as the predicted intention category of the sample sentence.

Further, the apparatus 1700 for recognizing a dialogue intention also includes a second obtaining module 1730, an inputting module 1740, and a determining module 1750.

The second obtaining module 1730 is configured to obtain a first training sentence labeled with an intention category and a plurality of second training sentences.

The inputting module 1740 is configured to input the first training sentence and the plurality of second training sentences into an intention recognition model to be trained to obtain a predicted intention category of the first training sentence.

The determining module 1750 is configured to adjust a model parameter of the intention recognition model to be trained based on a difference between the predicted intention category of the first training sentence and the intention category labeled for the first training sentence, and call the second obtaining module and the inputting module to perform the operations of obtaining the first training sentence labeled with an intention category and the plurality of second training sentences and inputting the first training sentence and the plurality of second training sentences into the intention recognition model to be trained to obtain the predicted intention category of the first training sentence till the difference between the predicted intention category of the first training sentence and the intention category labeled for the first training sentence meets a preset training terminating condition, and determine the intention recognition model to be trained having the adjusted model parameter as the trained intention recognition model.

It should be noted that the first obtaining module 1710 and the generating module 1720 have the same function and structure as the first obtaining module 1610 and the generating module 1620.

According to the apparatus for recognizing a dialogue intention in the embodiments of the present disclosure, a sample sentence with an intention category to be predicted and a plurality of supporting sentences each labeled with intention category are obtained; the sample sentence and the supporting sentences are input into a pre-trained intention recognition model, in which the pre-trained intention recognition model generates a sample sentence vector corresponding to the sample sentence and category vectors corresponding to the supporting sentences according to the sample sentence and the supporting sentences, calculates matching degrees between the sample sentence vector and the category vectors, and obtains a predicted intention category of the sample sentence according to the matching degrees. Therefore, the present disclosure combines the few shot learning technology, which may reduce the degree of dependence of the intention recognition model on the scale of the supporting sentences, avoid the overfitting phenomenon caused by a few of supporting sentences each labeled with the intention category, ensure the accuracy of the recognition of a dialogue intention, improve the ability of quickly recognizing a dialogue intention, and improve the reliability and efficiency in the recognition of a dialogue intention.

According to the embodiments of the present disclosure, there are also provided an electronic device and a readable-storage medium in the present disclosure.

Figure 18:
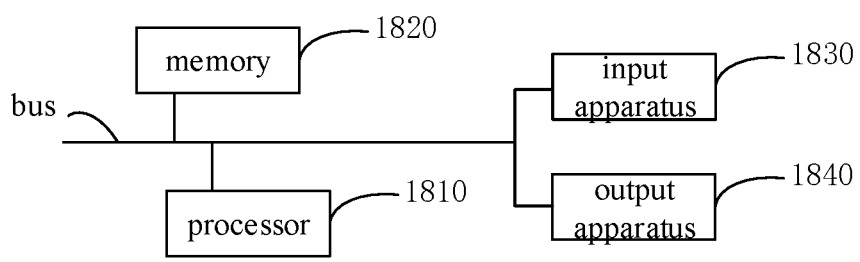
FIG. 18 is a block diagram illustrating an electronic device for recognizing a dialogue intention according to an embodiment of the present disclosure.

FIG. 18 is a block diagram illustrating an electronic device for recognizing a dialogue intention according to an embodiment of the present disclosure. Electronic devices are intended to represent various forms of digital computers, such as laptop computers, desktop computers, work tables, personal digital assistants, servers, blade servers, mainframe computers, and other suitable computers. Electronic devices can also represent various forms of mobile apparatus, such as personal digital processors, cellular phones, smart phones, wearable devices, and other similar computing apparatus. The components illustrated herein, their connections and relationships, and their functions are merely examples, and are not intended to limit the implementation of the disclosure described and/or required herein.

As illustrated in FIG. 18, the electronic device includes one or more processors 1810, a memory 1820, and interfaces for connecting various components, including high-speed interfaces and low-speed interfaces. The various components are connected to each other by different buses, and can be installed on a common motherboard or installed in other ways as needed. The processor may process instructions executed in the electronic device, including instructions stored in or on the memory to display graphical information of the GUI on an external input/output apparatus (such as a display device coupled to an interface). In other embodiments, when it is necessary, a plurality of processors and/or a plurality of buses can be used with a plurality of memories and a plurality of memories. Similarly, a plurality of electronic devices can be connected, and each device provides some necessary operations (for example, as a server array, a group of blade servers, or a multi-processor system). In FIG. 18, a processor 1810 is taken as an example.

The memory 1820 is a non-transitory computer-readable storage medium provided by the disclosure. The memory stores instructions that can be executed by at least one processor, so that at least one processor executes the method for recognizing a dialogue intention provided by the present disclosure. The non-transitory computer-readable storage medium of the present disclosure has computer instructions stored thereon, in which the computer instructions are used to make a computer execute the method for recognizing a dialogue intention provided by the present disclosure.

As a non-transitory computer-readable storage medium, the memory 1820 can be used to store non-transitory software programs, non-transitory computer-executable programs and modules, such as program instructions/modules corresponding to the method for recognizing a dialogue intention in the embodiments of the present disclosure (for example, the first obtaining module 1610, and the generating module 1620 illustrated in FIG. 16). The processor 1810 executes various functional applications and data processing of the server, i.e., executing the method for recognizing a dialogue intention in the above method embodiments, by running non-transitory software programs, instructions, and modules stored in the memory 1820.

The memory 1820 may include a storage program area and a storage data area, in which the storage program area may store an operating system and at least an application program required by one function; the storage data area may store data created by the use of the positioning electronic device. In addition, the memory 1820 may include a high-speed random access memory, and may also include a non-transitory memory, such as at least one magnetic disk storage device, a flash memory device, or other non-transitory solid-state storage devices. In some embodiments, the memory 1820 may optionally include a memory remotely provided compared with the processor 1810, and these remote memories may be connected to the positioning electronic device. Examples of the above networks include, but are not limited to, Internet, corporate Intranet, local area network, mobile communication network, and combinations thereof.

The electronic device for recognizing a dialogue intention may further include: an input apparatus 1830 and an output apparatus 1840. The processor 1810, the memory 1820, the input apparatus 1830, and the output apparatus 1840 may be connected by a bus or other methods. In FIG. 18, the connection by a bus is taken as an example.

The input apparatus 1830 can receive input digital or character information, and generate key signal input related to the user settings and function control of the positioning electronic device, such as touch screens, keypads, mousse, track pads, touchpads, and instructing arms, one or more mouse buttons, trackballs, joysticks and other input apparatus. The output apparatus 1840 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various implementations of the systems and technologies described herein can be executed in digital electronic circuit systems, integrated circuit systems, specific application-specific integrated circuit (ASIC), computer hardware, firmware, software, and/or combinations thereof. These various embodiments may be executed in one or more computer programs, in which the one or more computer programs may be executed and/or interpreted on a programmable system including at least one programmable processor, in which the programmable processor may be a dedicated or general purpose programmable processor that can receive data and instructions from the storage system, at least one input apparatus, and at least one output apparatus, and transmit the data and instructions to the storage system, at least one input apparatus, and at least one output apparatus.

These computational procedures (also called programs, software, software applications, or codes) include machine instructions of a programmable processor, and can be executed using high-level procedures and/or object-oriented programming languages, and/or assembly/machine language to execute computational procedures. As used herein, the terms "machine-readable medium" and "computer-readable medium" refer to any computer program product, device, and/or apparatus used to provide machine instructions and/or data to a programmable processor (for example, magnetic disks, optical disks, memories, programmable logic devices (PLD)), including machine-readable media that receive machine instructions as machine-readable signals. The term "machine-readable signal" refers to any signal used to provide machine instructions and/or data to a programmable processor.

In order to provide interaction with the user, the systems and technologies described herein can be executed on a computer and the computer includes a display apparatus for displaying information to the user (for example, a CRT (cathode ray tube) or an LCD (liquid crystal display) monitor)); and a keyboard and a pointing apparatus (for example, a mouse or a trackball) through which the user can provide input to the computer. Other types of apparatus can also be used to provide interaction with the user; for example, the feedback provided to the user can be any form of sensory feedback (for example, visual feedback, auditory feedback, or tactile feedback); and can be in any form (including acoustic input, voice input, or tactile input) to receive input from the user.

The systems and technologies described herein can be executed in a computing system that includes back-end components (for example, as a data server), or a computing system that includes middleware components (for example, an application server), or a computing system that includes front-end components (for example, a user computer with a graphical user interface or web browser through which the user can interact with the implementation of the systems and technologies described herein), or a computing system that includes any combination of the back-end components, middleware components, or front-end components. The components of the system can be connected to each other through any form or medium of digital data communication (for example, a communication network). Examples of communication networks include: a local area network (LAN), a wide area network (WAN), the Internet, and a blockchain network.

The computer system may include a client and a server. The client and server are generally far away from each other and usually interact through a communication network. The relationship between the client and the server is generated by computer programs that run on the corresponding computer and have a client-server relationship with each other. The server can be a cloud server, also known as cloud computing server or cloud host, which is a host product in the cloud computing service system to solve the problem of difficult management and weak business scalability of traditional physical hosts and VPS (Virtual Private Server) services. The server can also be the server for distributed system, or the server that combine block chain.

There is also provided a computer program product in the present disclosure, in which when the instruction processor in the computer program product is executed, the above method for recognizing a dialogue intention can be realized.

According to the method for recognizing a dialogue intention in the embodiments of the present disclosure, a sample sentence with intention category to be predicted and a plurality of supporting sentences labeled with intention category are obtained; the sample sentence and the supporting sentences are input into a pre-trained intention recognition model, in which the intention recognition model generates a sample sentence vector corresponding to the sample sentence and category vectors corresponding to the supporting sentences according to the sample sentence and the supporting sentences, matching degrees between the sample sentence vector and the category vectors are calculated, and a predicted intention category of the sample sentence is obtained according to a plurality of matching degrees. Therefore, the present disclosure combines the few shot learning technology to reduce the degree of dependence of the intention recognition model on the scale of the supporting sentence, to avoid overfitting phenomenon caused by a few supporting sentences with labeled intention category, to ensure the accuracy of the recognition result of the dialogue intention, to improve the ability to quickly recognize a dialogue intention, and to improve the reliability and the efficiency in the recognition process of a dialogue intention.

It is to be understood that the various forms of processes illustrated above can be used to reorder, add or delete blocks. For example, the blocks described in the present disclosure can be executed in parallel, sequentially, or in a different order, as long as the desired result of the technical solution disclosed in the present disclosure can be achieved, the blocks are not limited herein.

The above specific implementations do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of this disclosure.

What is claimed is:

1. A method for recognizing a dialogue intention, comprising:
   obtaining a sample sentence with an intention category to be predicted and a plurality of supporting sentences each labeled with an intention category; and
   inputting the sample sentence and the plurality of supporting sentences into a trained intention recognition model, wherein the trained intention recognition model is configured to generate a sample sentence vector corresponding to the sample sentence and category vectors corresponding to the plurality of supporting sentences based on the sample sentence and the plurality of supporting sentences, calculate matching degrees between the sample sentence vector and the category vectors, and obtain a predicted intention category of the sample sentence based on the matching degrees,
   wherein the trained intention recognition model is configured to generate the sample sentence vector corresponding to the sample sentence based on the sample sentence and the plurality of supporting sentences by:
generating a sample word vector sequence based on the sample sentence;
generating supporting word vector sequences based on the plurality of supporting sentences;
inputting the sample word vector sequence into a recurrent neural network based time sequence model to obtain an output hidden state of each sample word in the sample sentence;
inputting the supporting word vector sequences into the recurrent neural network based time sequence model to obtain an output hidden states of each supporting word in the plurality of supporting sentences; and
generating an output vector sequence corresponding to the sample sentence based on the output hidden state of each sample word and the output hidden state of each supporting word; and
generating the sample sentence vector based on the output vector sequence corresponding to the sample sentence.

2. The method of claim 1, wherein the trained intention recognition model is configured to generate the category vectors corresponding to the plurality of supporting sentences based on the sample sentence and the plurality of supporting sentences by:
generating supporting sentence vectors corresponding respectively to the plurality of supporting sentences based on the sample sentence and the plurality of supporting sentences; and
generating the category vectors corresponding to the plurality of supporting sentences based on the supporting sentence vectors.

3. The method of claim 2, wherein generating the supporting sentence vectors corresponding respectively to the plurality of supporting sentences based on the sample sentence and the plurality of supporting sentences comprises:
generating a sample word vector sequence based on the sample sentence;
generating supporting word vector sequences based on the plurality of supporting sentences;
inputting the sample word vector sequence into a recurrent neural network based time sequence model to obtain an output hidden state of each sample word in the sample sentence;
inputting the supporting word vector sequences into the recurrent neural network based time sequence model to obtain an output hidden state of each supporting word in the plurality of supporting sentences;
generating output vector sequences corresponding respectively to the plurality of supporting sentences based on the output hidden state of each sample word and the output hidden state of each supporting word; and
generating the supporting sentence vectors based on the output vector sequences corresponding respectively to the plurality of supporting sentences.

4. The method of claim 3, wherein generating the sample word vector sequence based on the sample sentence comprises:
performing a word segmentation on the sample sentence to obtain a plurality of sample words;
determining parts of speech of the plurality of sample words;
performing a named entity recognition on each sample word to obtain sample word named entities; and
generating the sample word vector sequence corresponding to the sample sentence based on the plurality of sample words, the part of speech of each sample word, and the sample word named entities.

5. The method of claim 3, wherein generating the supporting word vector sequences based on the plurality of supporting sentences comprises:
performing a word segmentation on each supporting sentence to obtain a plurality of supporting words;
determining parts of speech of the supporting words;
performing a named entity recognition on each supporting word to obtain supporting word named entities; and
generating the supporting word vector sequences corresponding to the plurality of supporting sentences based on the plurality of supporting words, the part of speech of each supporting word, and the supporting word named entities.

6. The method of claim 1, wherein generating the sample sentence vector based on the output vector sequence corresponding to the sample sentence comprises:
obtaining a term frequency and an inverse document frequency of each sample word in the sample sentence with respect to a corpus;
generating a weight of an output vector of each sample word based on the term frequency and the inverse document frequency of the respective sample word; and
generating the sample sentence vector based on output vectors in the output vector sequence corresponding to the sample sentence and the respective weights.

7. The method of claim 3, wherein generating the supporting sentence vectors based on output vector sequences corresponding respectively to the plurality of supporting sentences comprises:
obtaining a term frequency and an inverse document frequency of each supporting word in the plurality of supporting sentences with respect to a corpus;
generating a weight of an output vector of each supporting word based on the term frequency and the inverse document frequency of the respective supporting word; and
generating the supporting sentence vectors based on output vectors in the output vector sequences corresponding respectively to the plurality of supporting sentences and the respective weights.

8. The method of claim 2, wherein generating the category vectors corresponding to the plurality of supporting sentences based on the supporting sentence vectors comprises:
obtaining supporting sentence vectors labeled with a same intention category; and
generating the category vector corresponding to the same intention category based on the supporting sentence vectors labeled with the same intention category.

9. The method of claim 1, wherein the trained intention recognition model is configured to obtain the predicted intention category of the sample sentence based on the matching degrees by:
determining the intention category labeled for the category vector corresponding to a maximum matching degree among the matching degrees as the predicted intention category of the sample sentence.

10. The method of claim 1, further comprising:
obtaining a first training sentence labeled with an intention category and a plurality of second training sentences;
inputting the first training sentence and the plurality of second training sentences into an intention recognition model to be trained to obtain a predicted intention category of the first training sentence;

adjusting a model parameter of the intention recognition model to be trained based on a difference between the predicted intention category of the first training sentence and the intention category labeled for the first training sentence;

returning to the operation of obtaining a first training sentence labeled with an intention category and a plurality of second training sentences till the difference between the predicted intention category of the first training sentence and the intention category labeled for the first training sentence meets a preset training terminating condition, and determining the intention recognition model to be trained having the adjusted model parameter as the trained intention recognition model.

11. An electronic device, comprising:

at least one processor; and a memory communicatively coupled to the at least one processor;

wherein the memory is configured to store instructions executable by the at least one processor, wherein when the instructions are executed by the at least one processor, the at least one processor is configured to execute the method for recognizing a dialogue intention, comprising:

obtaining a sample sentence with an intention category to be predicted and a plurality of supporting sentences each labeled with an intention category; and inputting the sample sentence and the plurality of supporting sentences into a trained intention recognition model, wherein the trained intention recognition model is configured to generate a sample sentence vector corresponding to the sample sentence and category vectors corresponding to the plurality of supporting sentences based on the sample sentence and the plurality of supporting sentences, calculate matching degrees between the sample sentence vector and the category vectors, and obtain a predicted intention category of the sample sentence based on the matching degrees, wherein the trained intention recognition model is configured to generate the sample sentence vector corresponding to the sample sentence based on the sample sentence and the plurality of supporting sentences by:

generating a sample word vector sequence based on the sample sentence;

generating supporting word vector sequences based on the plurality of supporting sentences;

inputting the sample word vector sequence into a recurrent neural network based time sequence model to obtain an output hidden state of each sample word in the sample sentence;

inputting the supporting word vector sequences into the recurrent neural network based time sequence model to obtain an output hidden states of each supporting word in the plurality of supporting sentences; and generating an output vector sequence corresponding to the sample sentence based on the output hidden state of each sample word and the output hidden state of each supporting word; and generating the sample sentence vector based on the output vector sequence corresponding to the sample sentence.

12. The device of claim 11, wherein the trained intention recognition model is configured to generate the category vectors corresponding to the plurality of supporting sentences based on the sample sentence and the plurality of supporting sentences by:

generating supporting sentence vectors corresponding respectively to the plurality of supporting sentences based on the sample sentence and the plurality of supporting sentences; and generating the category vectors corresponding to the plurality of supporting sentences based on the supporting sentence vectors.

13. The device of claim 12, wherein generating the supporting sentence vectors corresponding respectively to the plurality of supporting sentences based on the sample sentence and the plurality of supporting sentences comprises:

generating a sample word vector sequence based on the sample sentence;

generating supporting word vector sequences based on the plurality of supporting sentences;

inputting the sample word vector sequence into a recurrent neural network based time sequence model to obtain an output hidden state of each sample word in the sample sentence;

inputting the supporting word vector sequences into the recurrent neural network based time sequence model to obtain an output hidden state of each supporting word in the plurality of supporting sentences;

generating output vector sequences corresponding respectively to the plurality of supporting sentences based on the output hidden state of each sample word and the output hidden state of each supporting word; and generating the supporting sentence vectors based on the output vector sequences corresponding respectively to the plurality of supporting sentences.

14. The device of claim 13, wherein generating the sample word vector sequence based on the sample sentence comprises:

performing a word segmentation on the sample sentence to obtain a plurality of sample words;

determining parts of speech of the plurality of sample words;

performing a named entity recognition on each sample word to obtain sample word named entities; and generating the sample word vector sequence corresponding to the sample sentence based on the plurality of sample words, the part of speech of each sample word, and the sample word named entities.

15. The device of claim 13, wherein generating the supporting word vector sequences based on the plurality of supporting sentences comprises:

performing a word segmentation on each supporting sentence to obtain a plurality of supporting words;

determining parts of speech of the supporting words;

performing a named entity recognition on each supporting word to obtain supporting word named entities; and generating the supporting word vector sequences corresponding to the plurality of supporting sentences based on the plurality of supporting words, the part of speech of each supporting word, and the supporting word named entities.

16. The device of claim 11, wherein generating the sample sentence vector based on the output vector sequence corresponding to the sample sentence comprises:

obtaining a term frequency and an inverse document frequency of each sample word in the sample sentence with respect to a corpus;

generating a weight of an output vector of each sample word based on the term frequency and the inverse document frequency of the respective sample word; and generating the sample sentence vector based on output vectors in the output vector sequence corresponding to the sample sentence and the respective weights.

17. The device of claim 13, wherein generating the supporting sentence vectors based on output vector sequences corresponding respectively to the plurality of supporting sentences comprises:
- obtaining a term frequency and an inverse document frequency of each supporting word in the plurality of supporting sentences with respect to a corpus;
- generating a weight of an output vector of each supporting word based on the term frequency and the inverse document frequency of the respective supporting word; and
- generating the supporting sentence vectors based on output vectors in the output vector sequences corresponding respectively to the plurality of supporting sentences and the respective weights.

18. A non-transitory computer-readable storage medium having computer instructions stored thereon, wherein the computer instructions are configured to cause a computer to execute the method for recognizing a dialogue intention, comprising:
- obtaining a sample sentence with an intention category to be predicted and a plurality of supporting sentences each labeled with an intention category; and
- inputting the sample sentence and the plurality of supporting sentences into a trained intention recognition model, wherein the trained intention recognition model is configured to generate a sample sentence vector corresponding to the sample sentence and category vectors corresponding to the plurality of supporting sentences based on the sample sentence and the plurality of supporting sentences, calculate matching degrees between the sample sentence vector and the category vectors, and obtain a predicted intention category of the sample sentence based on the matching degrees,
- wherein the trained intention recognition model is configured to generate the sample sentence vector corresponding to the sample sentence based on the sample sentence and the plurality of supporting sentences by:
- generating a sample word vector sequence based on the sample sentence;
- generating supporting word vector sequences based on the plurality of supporting sentences;
- inputting the sample word vector sequence into a recurrent neural network based time sequence model to obtain an output hidden state of each sample word in the sample sentence;
- inputting the supporting word vector sequences into the recurrent neural network based time sequence model to obtain an output hidden states of each supporting word in the plurality of supporting sentences; and
- generating an output vector sequence corresponding to the sample sentence based on the output hidden state of each sample word and the output hidden state of each supporting word; and
- generating the sample sentence vector based on the output vector sequence corresponding to the sample sentence.

* * * * *